Patented July 20, 1954

2,684,338

UNITED STATES PATENT OFFICE 2,684,338

EMULSIFIER FOR PARAFFINIC SUBSTANCES

Frank L. McGowan, Malden, and John P. Conley, Dorchester, Mass.

No Drawing. Application May 25, 1949, Serial No. 95,376

5 Claims. (Cl. 252—311.5)

This invention comprises a new and improved emulsifier for paraffinic substances and includes within its scope the novel process of preparing the emulsifier herein disclosed.

It has been appreciated for many years that paraffinic substances would be rendered more useful in various arts if they could be dispersed or emulsified in water, and many unsuccessful attempts have been made to solve this problem of long standing.

Paraffin products, however, present difficulties in their emulsification which are not normally encountered when emulsifying non-paraffinic substances.

It is possible to emulsify a light paraffin oil by blending in the oil an aqueous soap solution with an organic coupling agent and a fatty acid, the proportions of these ingredients and the oil being adjusted until the whole mixture is in balance and is perfectly clear and homogeneous. The final emulsion of the paraffin oil may be secured by stirring the mixture into water to produce an emulsion of the desired consistency. On the other hand, the described procedure, when applied to paraffin waxes, does not make satisfactory emulsions.

Since, as is known, non-paraffinic substances, in general, are quite readily emulsified and the light paraffin oils, by means of the procedure just described, are also readily emulsified, we have deduced the conclusion that by adding a non-paraffinic organic substance, whose molecular structure at least in part is similar to that of the paraffin, to a combination of aqueous soap, organic coupling agent and fatty acid, an emulsifier for paraffinic substances, particularly the waxes, should be produced. This reasoning has been justified, for we have discovered that by the addition of a non-paraffinic and non-saponifiable organic substance, a portion of whose molecular structure resembles that of the paraffins, to a mixture of aqueous soap, organic coupling agent and fatty acid, an emulsifier is obtained which, when blended in the proper quantity with a paraffin oil or wax, or combination of the two, will produce a stable emulsion by simply stirring the mixture into water, provided the two phases are kept at a temperature high enough to insure complete fluidity of all the components.

Our invention provides a stable, easily manufactured and efficient emulsifier which, without the necessity of homogenization, will emulsify many times its own weight of certain paraffinic substances such as paraffin oils, scale (impure paraffin) wax and paraffin waxes, either alone or in combination with one another. The emulsions so produced are stable for long periods of time, fluid at high concentration of solids and capable of infinite dilution with water without agglomeration or breaking.

An emulsifier embodying our invention may be prepared by adding the non-saponifiable, non-paraffinic organic substance and the fatty acid to an aqueous soap solution and the coupling agent. The mixture is then blended to a uniform consistency by means of heat and agitation. When clear and homogeneous the product is allowed to cool and then takes on the appearance and consistency of a wax.

The water soluble soap portion of the emulsifier may be made by the addition of suitable alkaline materials (reacting either separately or in combination) to suitable organic fatty acids or esters thereof until the alkaline metal or organic salt of the acid is produced. If an acid is used, the process is simple neutralization and in addition to the salt of the acid water is produced. If the acid is used in ester form, the reaction is a saponification and instead of water as the second product of reaction, an alcohol is liberated.

Preferred alkaline materials are potassium or sodium hydroxide or the organic nitrogen bases such, for example, as triethanol amine, diethanol amine, tri-isopropanol amine, etc. While it is impracticable to list here all alkaline materials suitable for the purposes of this invention, those above named are the best now known to us. They are typical of equivalent materials of a larger group and the employment of such other alkaline materials as substitutes is contemplated by this invention.

The fatty acids or their esters used in preparing the water soluble soap may be selected from a wide field, for example, palmitic, myristic, stearic, oleic, linoleic or their esters, preferably glycerol esters, which may be saturated or unsaturated or mixtures of the two, but which have more than 10 carbon atoms to the organic acid molecule. Hydrogenated marine oil, tall oil or tallow may likewise be used.

The mutual solvent or coupling agent used in the production of our novel emulsifier may be chosen from that group of organic chemicals which fulfills the following requirements:

(1) Low vapor pressure at normal conditions of temperature and pressure;
(2) Complete solubility in water;
(3) Stability up to at least 300° F.
(4) Possess no more than a mild odor.

As typical examples of suitable coupling agents which may be used singly or in combination we may list glycols or polyhydroxy alcohols, such as ethylene glycol, glycerol, 2-methyl-2-4 pentanediol, or equivalent materials; hydroxy ethers or alcohol ethers, such as diethylene glycol, ethylene glycol monobutyl ether, diethylene glycol mono-butyl ether, diethylene glycol mono-ethyl ether, or equivalent materials; polyethers, such as diethylene glycol diethyl ether, tetraethylene glycol dimethyl ether, or equivalent materials.

The free fatty acids not present as soap but in addition to the soap may be selected from the following acids: first, saturated, such as palmitic, lauric, myristic, stearic, etc.; second, unsaturated, such as oleic, linoleic, linolenic, eleostearic, etc., or the hydrogenated varieties of these acids; third, industrial acids, which are mostly mixtures of two or more acids, such as distilled tall oil acids, tallow fatty acids, palm oil fatty acids, cocoanut oil fatty acids, marine oil fatty acids, etc., or the hydrogenated varieties of any one of them.

The fourth component of our improved emulsifier, viz., the non-paraffinic non-saponifiable organic material, may be selected from the group of organic chemicals which meet the following requirements:

(1) Insoluble in water, or having a very limited solubility in water.

(2) Incapable of reacting with an alkaline material to form a soap or soap like material.

(3) Must have a low rate of evaporation, i. e., low vapor pressure or substantially non-volatile.

(4) May be liquid or solid but if solid must have the ability to become fluid when subjected to moderate heat (under 300° F.).

(5) May be pure hydrocarbon (but not of the paraffin series) or may contain an active group or groupings. The compounds must have a carbon chain composed of at least six carbon atoms linked to each other as an integral part of the molecular structure. Such compounds may be aliphatic, aromatic or acylic in nature, i. e., may be straight or branched chain hydrocarbons or substituted hydrocarbons or they may possess a ring or closed structure. Or combinations of the two, or an aliphatic compound may be blended with a ring type compound.

(6) Must be compatible with the paraffins and the mixture of soap, organic mutual solvent and fatty acid.

Among the non-paraffinic, non-saponifiable organic substances which are well suited for the purpose of our invention are dipentene, terpineol, amyl and poly amyl naphthalenes, nonyl naphthalene, cetyl, stearyl and nonyl alcohol, biphenyl and certain polymeric petroleum derivatives such as the trade named products "Dutrex" and "Indonex." While it is impracticable to list here all substances suitable for the purpose of this invention, those named are the best now known to us. They are typical of equivalent substances having the same characteristics and the employment of such other substances as substitutes is contemplated by this invention.

The emulsifier of our invention may be prepared by charging a suitable vessel provided with a steam jacket and stirring device with a mixture of fatty glyceride in the proper amount and a quantity of the coupling agent which may be a single material or a blend of two or more similar components. The mixture is then heated until it becomes completely fluid and the caustic solution in an amount necessary to react with the fat is added with agitation. Saponification is now allowed to take place and when completed the necessary quantity of free fatty acids and the non-saponifiable, non-paraffinic substance is added. The whole mixture is then blended by heat and agitation until a completely homogeneous product is obtained. When this stage is reached, the mixture is allowed to cool at room temperature, whereupon the emulsifier solidifies with a waxlike appearance and consistency.

The order of adding materials is not critical, except that if soap is to be formed from a fat, the saponification must be completed before the addition of the fatty acid; otherwise the caustic would neutralize the acids in preference to saponifying the fat.

The following examples illustrate different embodiments of our novel emulsifier:

*Example #1*

105 lbs. hydrogenated marine oil
53 lbs. diethylene glycol
40.8 lbs. potassium hydroxide sol. 49.5%
70 lbs. hydrogenated marine oil fatty acids
45 lbs. polyamyl naphthalenes

*Example #2*

105 lbs. hydrogenated marine oil
53 lbs. diethylene glycol
40.8 lbs. potassium hydroxide sol. 49.5%
68 lbs. hydrogenated marine oil fatty acids
36 lbs. "Indonex"
9 lbs. polyamyl naphthalenes

*Example #3*

105 lbs. tallow
38 lbs. diethylene glycol
15 lbs. glycerol
39 lbs. potassium hydroxide sol. 51.75%
40 lbs. hydrogenated marine oil fatty acids
35 lbs. tallow fatty acids
45 lbs. polyamyl naphthalenes

*Example #4*

105 lbs. hydrogenated marine oil
33 lbs. diethylene glycol
20 lbs. glycerol
40.8 lbs. potassium hydroxide sol. 49.5%
68 lbs. hydrogenated marine oil fatty acids
45 lbs. nonyl naphthalene

*Example #5*

105 lbs. hydrogenated marine oil
53 lbs. diethylene glycol
41.3 lbs. potassium hydroxide sol. 48.8%
68 lbs. hydrogenated marine oil fatty acids
45 lbs. cetyl alcohol

*Example #6*

39 lbs. hydrogenated marine oil
13 lbs. diethylene glycol
15.5 lbs. potassium hydroxide sol. 48.8%
20 lbs. hydrogenated marine oil fatty acids
15 lbs. dipentene

*Example #7*

39 lbs. hydrogenated marine oil
13 lbs. diethylene glycol
13.3 lbs. sodium hydroxide sol. 40.5%
20 lbs. hydrogenated marine oil fatty acids
15 lbs. dipentene In each case the last item listed is the non-paraffinic, non-saponifiable organic component described as the fourth ingredient of the emulsifier. One part of the emulsifiers above described will readily emulsify 6 to 7 parts 123–125° paraffin wax or scale wax, or 133–135° paraffin wax. The emulsion is readily formed by merely stirring the fluid wax emulsifier combination into hot water. When the emulsion has once been formed, it may be diluted with water to any desired degree and will maintain its emulsified condition for long periods of time.

We are familiar with United States Letters Patent No. 2,244,685 wherein is disclosed an emulsifier for paraffin wax which includes in its composition a saponifiable wax such, for example, as candelilla or shellac wax. While the emulsifier therein described is satisfactory to some extent, its saponifiable wax constituent is expensive at all times and generally less readily obtainable under war-time conditions. Moreover, as a practical matter, its use is limited to the emulsification of scale wax. Further, even in emulsifying scale wax it is necessary to add 1 to 3% water for the emulsifying step. This causes precipitation of the wax and necessitates an objectionable delay until the precipitated wax can be re-absorbed into the system prior to making the emulsion. The emulsifier of our invention has the advantage that no water is required prior to the actual emulsifying step, and accordingly no delay is caused by precipitation of any component at an intermediate stage.

Having thus disclosed our inventon and described in detail certain illustrative embodiments thereof, we claim as new and desire to secure by Letters Patent:

1. An emulsifier capable of emulsifying paraffin waxes without homogenization, comprising: a water-soluble soap, an inert solvent selected from the group consisting of glycerol, ethylene glycol, 2-methyl-2-4 pentanediol, diethylene glycol ethylene glycol mono-butyl ether, diethylene glycol mono-butyl ether, diethylene glycol monoethyl ether; a free fatty acid having from twelve to nineteen carbon atoms; and an alkyl naphthalene compatible with paraffin wax and compatible with the aforesaid soap, solvent and fatty acid.

2. An emulsifier as defined in claim 1 in which the alkyl naphthalene compound is an amyl naphthalene.

3. An emulsifier as defined in claim 1 in which the alkyl naphthalene componud is a polyamyl naphthalene.

4. An emulsifier as defined in claim 1 in which the alkyl naphthalene compound is a nonyl naphthalene.

5. An emulsified paraffin wax comprising paraffin wax emulsified by the emulsifier defined in claim 1.

References Cited in the file of this patent

UNITED STATES PATENTS

| Number | Name | Date |
| --- | --- | --- |
| 1,460,251 | Kramer | June 26, 1923 |
| 1,707,469 | Knight | Apr. 2, 1929 |
| 1,934,450 | Sheppard et al. | Nov. 7, 1933 |
| 2,022,766 | Harris | Dec. 3, 1935 |
| 2,070,177 | Pickett | Feb. 9, 1937 |
| 2,091,062 | Yates | Aug. 24, 1937 |
| 2,364,632 | Handy | Dec. 12, 1944 |

OTHER REFERENCES

Goodman: Cosmetic Dermatology, 1936, McGraw-Hill Book Co., p. 492.

Chilson: "Modern Cosmetics," 1938, p. 153—Formula No. 2. Copy in Div. 43.